Figure 1:
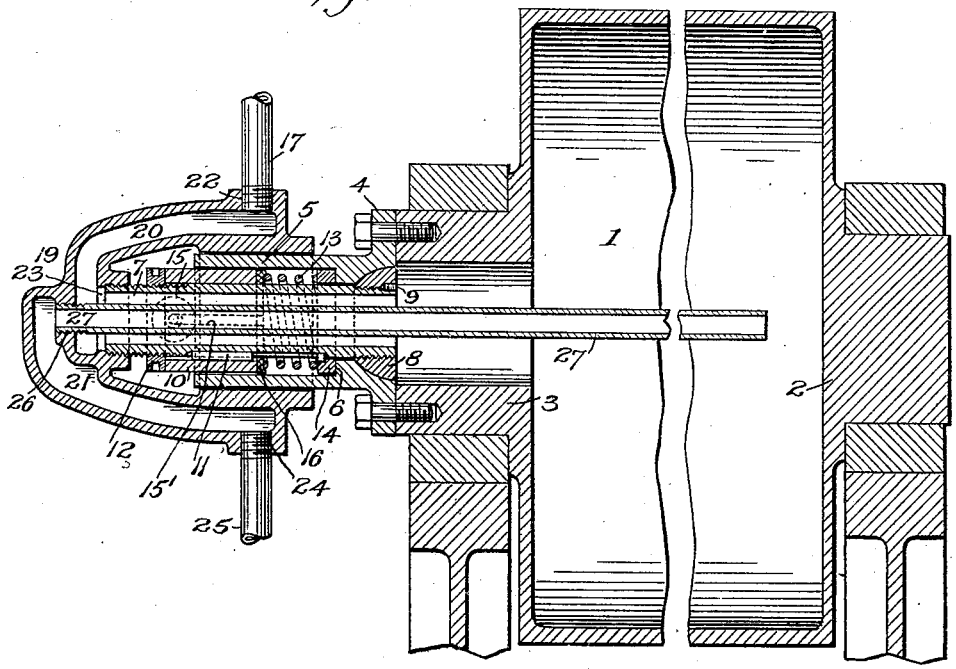

M. J. WHITLOCK.
HOLLOW ROLL.
APPLICATION FILED FEB. 10, 1908.

921,771.

Patented May 18, 1909.
2 SHEETS—SHEET 1.

Witnesses:
A. White
S. E. Brown

Inventor:
Myron J. Whitlock
by his Atty's:
Philipp, Sawyer, Rice & Kennedy

M. J. WHITLOCK.
HOLLOW ROLL.
APPLICATION FILED FEB. 10, 1908.
921,771.
Patented May 18, 1909.
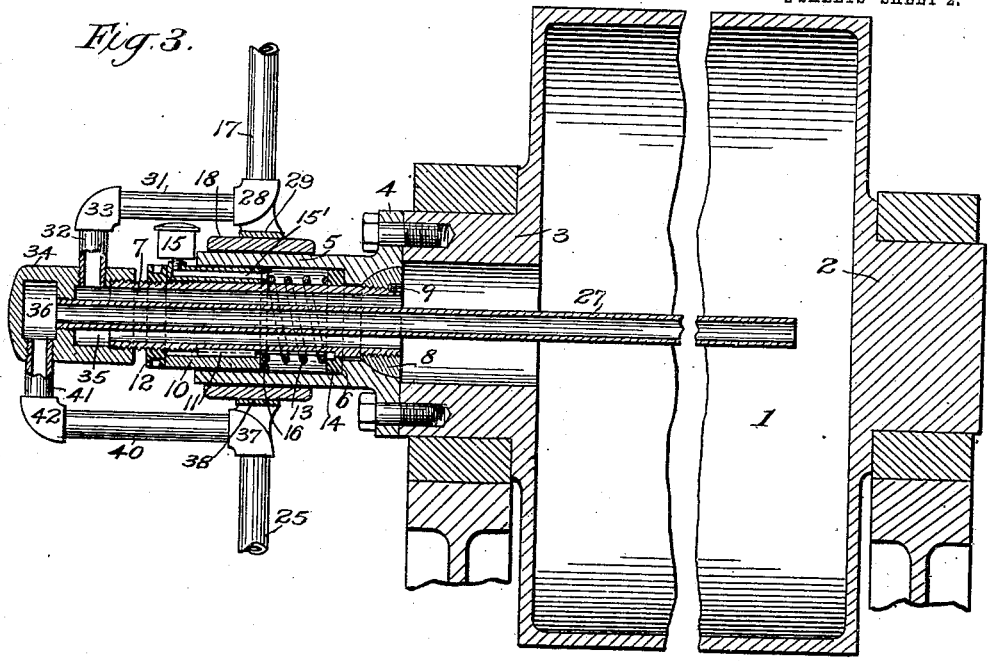
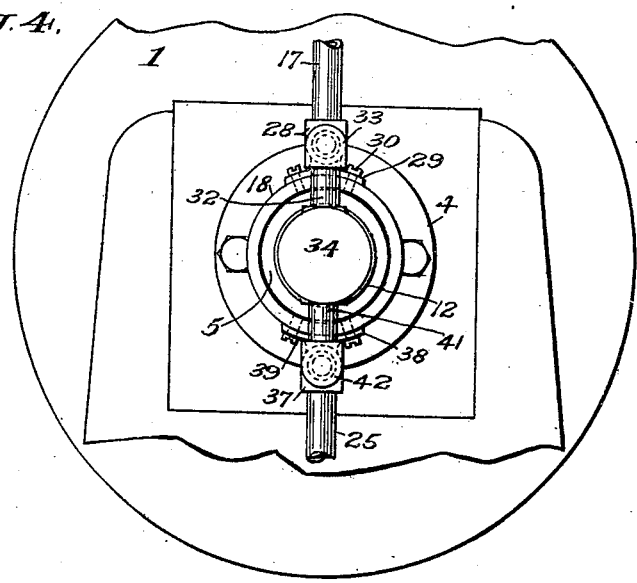
Witnesses:
Q. White
J. E. Brown
Inventor:
Myron J. Whitlock
by his Atty's;
Philipp, Sawyer, Rice & Kennedy

UNITED STATES PATENT OFFICE.

MYRON J. WHITLOCK, OF ANSONIA, CONNECTICUT.

HOLLOW ROLL.

No. 921,771.

Specification of Letters Patent.

Patented May 18, 1909.

Application filed February 10, 1908. Serial No. 415,077.

*To all whom it may concern:*

Be it known that I, MYRON J. WHITLOCK, a citizen of the United States, residing at Ansonia, county of New Haven, and State of Connecticut, have invented certain new and useful Improvements in Hollow Rolls, fully described and represented in the following specification and the accompanying drawings, forming a part of the same.
This invention relates to certain improvements in steam-heated or water-cooled cylinders or rolls. In rolls of this character, as heretofore constructed, and in which the cooling or heating fluid is admitted to the cylinder through a hollow journal, it has been customary to bolt a head or cap to the end of the cylinder journal and to lead the induction and eduction pipes for the fluid through this head, the induction pipe being usually arranged within the eduction pipe. These pipes were necessarily stationary, and a fluid tight joint or joints was provided between the head of the outer pipe. Fluid was supplied to the induction and led away from the eduction pipes by piping secured to a head or fitting which communicated with these pipes. This head or fitting was secured to the eduction pipe and its weight and the weight of the piping was, therefore, sustained by this pipe. As the piping is, in many cases, very long, and the end of the eduction pipe is necessarily located some distance beyond the head referred to, the weight of the piping and head, which was carried on the end of this pipe, caused the bearing parts of the joints to wear rapidly and to get out of alinement, making it necessary to renew the parts.

The present invention has for its object to produce an improved construction to be used with cylinders of the character referred to by which the pipe or pipes communicating with the cylinder shall be relieved from the duty of sustaining the weight of the piping and connected parts, thereby avoiding the wear hereinbefore referred to and making the replacement of parts unnecessary.

With this and other objects in view, the invention consists in certain constructions and in certain parts, improvements and combinations as will be hereinafter fully described and then specifically pointed out in the claims.

Figure 2:
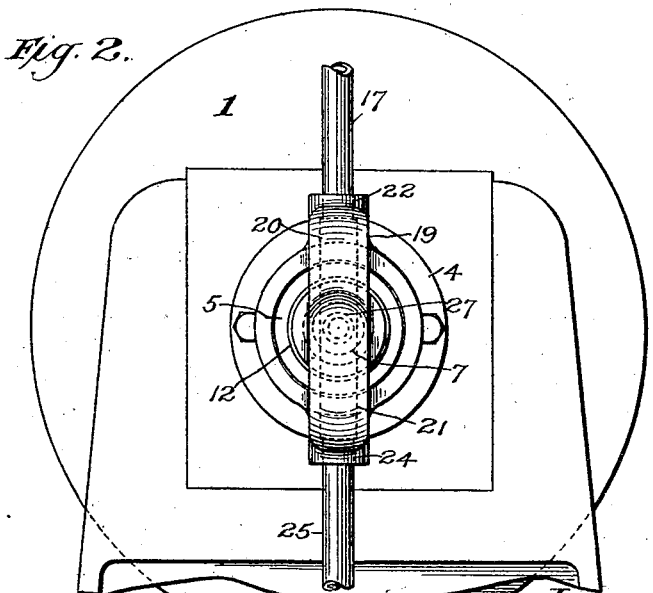

Referring to the accompanying drawings—
Figure 1 is a vertical sectional view taken through the head and cylinder, said view illustrating the connections by which fluid is supplied to and led away from the cylinder. Fig. 2 is an end view of the construction shown in Fig. 1. Figs. 3 and 4 illustrate in cross-section and end elevation respectively a modified form of the construction.

In the drawings, 1 represents the cylinder, the cylinder being provided with journals 2, 3, these journals being supported in journal boxes of the usual type. The journal 3 is made hollow, as illustrated, to permit the introduction and withdrawal from the cylinder of steam or heating or cooling water, as the case may be. To the end of the hollow journal 3 of the cylinder is secured by means of screws, or in any other suitable manner, a head or cap 4. In the best constructions, this head or cap 4 will have a projecting part, as 5, which may be chambered out so that its bore is slightly greater than the bore through the body of the head, whereby a shoulder, indicated at 6, is produced.

In the particular construction illustrated, there is provided an induction pipe, marked 7, which leads through the head, a fluid tight joint being provided between the head and this pipe. While the means for effecting this tight joint may be varied, in the particular constructions illustrated, the pipe is surrounded by a convex bearing surface 8 into which the pipe is secured, the bearing surface being further rigidly connected to the pipe by means of a key 9 or in any other suitable manner. This bearing surface forms a ground joint with the head, as shown. If there be fluid pressure in the cylinder, it will tend to force the bearing surface 8 against the surface of the head and thus keep the joint tight, but to prevent leakage, when the pressure is low in the cylinder, additional means may be employed for the purpose of keeping this joint tight. While these means may be varied, in the construction illustrated, a sleeve 10 is employed which extends into the chambered out portion of the head referred to, surrounds the induction pipe, and may be prevented from turning by being splined to said pipe, as indicated at 11. The end of the eduction pipe beyond the sleeve may be threaded, as indicated, and provided with an adjusting nut 12. Between the end of the sleeve and the shoulders 6 before referred to, there may be located a spring 13, the tension of which may be adjusted by turning the nut. The inner end of the spring may bear against a thrust collar, as 14, which may be keyed to the induction pipe, as shown, which collar in turn rests against the shoulders 6 of the head before referred to. The chamber in which the spring lies may serve as an oil containing chamber for the bearing parts, the oil being supplied in any suitable manner, as by a cup 15 screwed into the sleeve 10, the oil being led into the chamber through a passage 15′ formed in the sleeve. A felt washer, indicated at 16, against which the outer end of the spring bears, may be provided to assist in controlling the flow of the oil.

The fluid is supplied to the induction pipe through piping 17, leading from a suitable source of fluid supply, not shown. While this piping may be supported in various ways, it will, in constructions involving the invention, be so supported that its weight is not carried by the induction pipe. Two constructions by which the invention may be carried into effect are illustrated. In both of these constructions, a supporting member for the piping is employed and the member is carried on the head referred to, so that the weight of the piping is sustained by the head. In the construction illustrated in Figs. 1 and 2, this supporting member is in the form of a casting 19 which is supported on the projecting part 5 of the head 4. This casting may be so formed as to provide both an induction and an eduction passage when, as in the constructions illustrated, both the induction and eduction pipes are at the same side of the cylinder. As shown, the casting is cored out to form an induction passage 20 and an eduction passage 21. Further, as illustrated in Fig. 1, the end of the piping 17 is screwed into a tapped opening 22 in the casting which opening communicates with the passage 20 before referred to. The end of this passage 20 may be in open communication with a tapped opening 23 also formed in the casting 19 in which opening the induction pipe 7 before referred to may be screwed. The casting 19 may further be provided with a tapped opening 24 into which eduction piping 25 may be screwed, this opening 24 being in communication with the passage 21. In order to provide for the carrying away of the condensed steam or other fluid employed in the cylinder, the casting 19 may be further provided with a tapped opening 26 in open communication with the passage 21 and into this opening an eduction pipe 27 may be screwed.

In the construction illustrated in Figs. 3 and 4, the supporting member comprises a collar 18 which may be provided with an elbow 28 which has a foot 29 connected thereto, this foot being secured by screws 30 or in any other suitable manner to the collar 18. Beyond this elbow the piping 17 may be extended by sections 31, 32 which are connected by an elbow 33 to a head or fitting 34 which may be provided with two chambers 35, 36. This head or fitting may be secured to the end of the induction pipe 7 as illustrated, and the section 32 of the piping may be screwed into the head or fitting so as to communicate with the chamber 35 from which the induction pipe 7 leads. The collar 18 may be provided with a second elbow 37 secured to the collar by a foot 38, the attachment being effected by screws 39, or in any other suitable manner, and the pipe 25 may be screwed into this elbow. Beyond the elbow, the pipe 25 may be continued by sections 40, 41 connected by an elbow 42 to the chamber 36, the section 41 being screwed into an opening in the fitting which leads into this chamber.

In the constructions described, it will be seen that the induction pipe is relieved from the duty of supporting the weight of the lines of piping referred to as well as the fitting and the eduction pipe, the weight of all these parts being finally sustained by the head which is bolted to the cylinder. With these constructions, therefore, the liability of wear between this pipe and the head is done away with and the life of the pipe may be prolonged practically indefinitely.

Changes and variations may be made in the constructions herein shown and described for carrying the invention into effect. The invention is not, therefore, to be limited to the specific constructions illustrated.

What is claimed is:—

1. The combination with a cylinder mounted to rotate and arranged to have its temperature determined by fluid introduced thereinto, of a pipe communicating with the interior of the cylinder, a head secured to the cylinder, a fluid tight joint between the head and the pipe, piping communicating with the pipe, and means independent of the pipe for supporting the piping, whereby the pipe is relieved from supporting the piping.

2. The combination with a cylinder mounted to rotate and arranged to have its temperature determined by fluid introduced thereinto, of a pipe communicating with the interior of the cylinder, a head secured to the cylinder said head having a projecting part, a fluid tight joint between the head and the pipe, piping communicating with the pipe, and means whereby the projecting part of the head is caused to sustain the weight of the piping.

3. The combination with a cylinder mounted to rotate and arranged to have its temperature determined by fluid introduced thereinto, of a pipe communicating with the interior of the cylinder, a head secured to the cylinder said head having a projecting part, a fluid tight joint between the head and the cylinder, piping communicating with the pipe, a supporting member mounted on the projecting part of the head, and means whereby said member is caused to sustain the weight of the piping.

4. The combination with a cylinder mounted to rotate and arranged to have its temperature determined by fluid introduced thereinto, of a head secured thereto, fluid induction and eduction pipes passing through the head one of said pipes being inside the other, a fluid tight joint between the outer pipe and the head, piping communicating with said induction and eduction pipes, and means independent of said pipes for supporting the piping.

5. The combination with a cylinder mounted to rotate and arranged to have its temperature determined by fluid introduced thereinto, of a head secured thereto said head having a projecting part, induction and eduction pipes passing through the head one of said pipes being within the other, a fluid tight joint between the outer pipe and the head, piping communicating with said pipes, and means whereby the projecting part of the head is caused to sustain the weight of the piping.

6. The combination with a cylinder mounted to rotate and arranged to have its temperature determined by fluid introduced thereinto, of a head secured thereto said head having a projecting part, induction and eduction pipes passing through the head one of said pipes being within the other, a fluid tight joint between the head and the outer pipe, a supporting member mounted on the projecting part of the head, piping, and an intermediate communicating connection between said piping and pipe, said connection and piping being carried by the supporting member, whereby the weight of the piping and connection is supported by the head.

7. The combination with a cylinder mounted to rotate and arranged to have its temperature determined by fluid introduced thereinto, of a head secured thereto, said head having a projecting part, a casting supported on the said projecting part, piping connected to the casting, and a pipe also connected to the casting and extending into the interior of the cylinder, said casting being formed to provide a communicating passage between the piping and the pipe, whereby the head sustains the weight of the piping.

8. The combination with a cylinder mounted to rotate and arranged to have its temperature determined by fluid introduced thereinto, of a head secured thereto, said head having a projecting part, a casting supported on said projecting part, induction and eduction pipes connected to the casting and leading to the interior of the cylinder, and induction and eduction piping connected to the casting, said casting being formed to provide passages by which the pipes are connected with the piping.

9. The combination with a cylinder mounted to rotate and arranged to have its temperature determined by fluid introduced thereinto, of a head secured thereto, said head having a chambered projecting part, a pipe passing through said projecting part and communicating with the interior of the cylinder, a fluid tight joint between the head and the pipe, a sleeve surrounding the pipe and lying in the chambered portion of the head, a spring between the end of the sleeve and the body of the head, means for adjusting the sleeve to vary the tension of the spring, piping whereby fluid is supplied to the pipe, and means whereby the projecting portion of the head is caused to sustain the weight of the piping.

10. The combination with a cylinder mounted to rotate and arranged to have its temperature determined by a head secured thereto, said head having a chambered projecting part, induction and eduction pipes passing through the head, one of said pipes lying inside the other, a fluid tight joint between the head and the outer pipe, a sleeve surrounding the outer pipe and lying in the chambered portion of the head, a spring between the sleeve and the body of the head, means for adjusting the sleeve to vary the tension of the spring, intermediate communicating connections between the piping and the pipes, and a supporting member on the projecting portion of the head whereby the head sustains the weight of the piping.

11. The combination with a cylinder mounted to rotate and arranged to have its temperature determined by fluid introduced thereinto, of a head secured thereto, said head having a chambered projecting part, a casting supported on the head, induction and eduction pipes passing through the head, one of said pipes lying within the other and said pipes being connected to the casting, a fluid tight joint between the body of the head and the outer pipe, a sleeve surrounding the outer pipe and lying in the chambered portion of the head, a spring between the end of the sleeve and the body of the head, means for adjusting the sleeve to vary the tension of the spring, and piping connected to the casting, said casting being formed to provide passages between the piping and the pipes.

In testimony whereof, I have hereunto set my hand, in the presence of two subscribing witnesses.

MYRON J. WHITLOCK.

Witnesses:
NORMAN P. KNIGHT.
B. O. HALE.